April 5, 1966     W. W. WOODS     3,243,992
GAUGING DEVICE

Filed Sept. 12, 1963     2 Sheets-Sheet 1

INVENTOR.
WEIGHTSTILL W. WOODS
BY
*Reynolds & Christensen*
ATTORNEYS

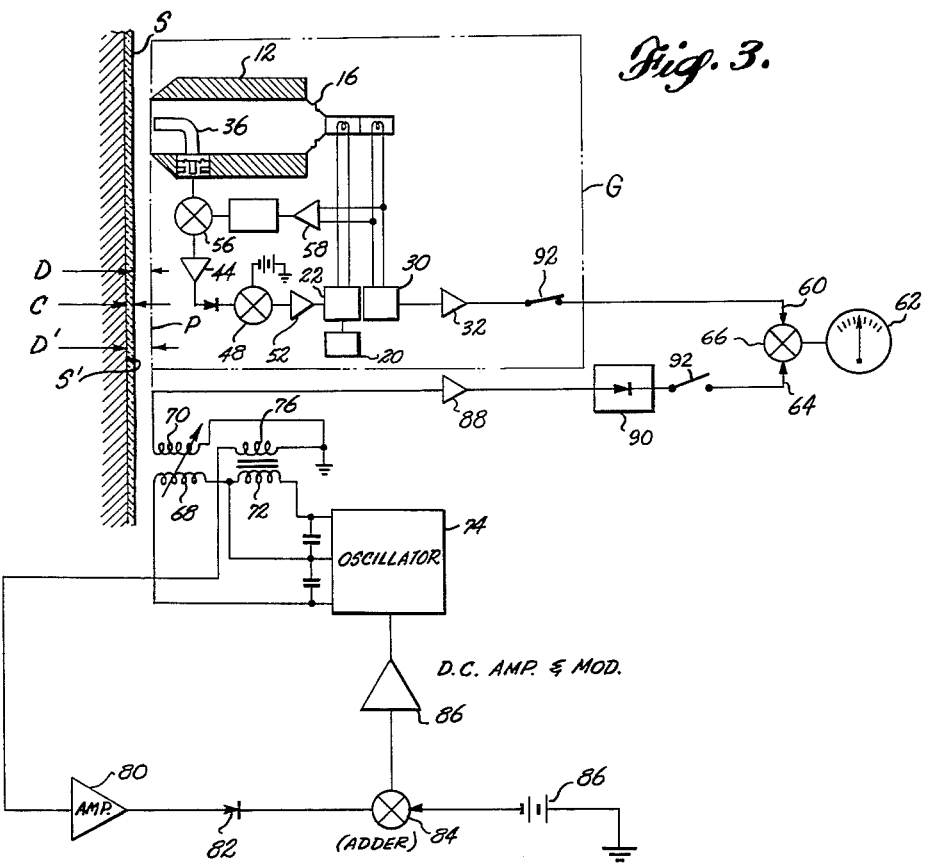

United States Patent Office 3,243,992
Patented Apr. 5, 1966

3,243,992
GAUGING DEVICE
Weightstill W. Woods, East Redmond, Wash., assignor to The Boeing Company, Seattle, Wash., a corporation of Delaware
Filed Sept. 12, 1963, Ser. No. 308,436
13 Claims. (Cl. 73—37.5)

This invention relates to improved devices for gauging distance of separation between a reference plane and a surface; also for gauging thickness of a dielectric layer overlying an electrically conductive substrate. In the latter application the first-mentioned gauging device is utilized in combination with a means which gauges the distance of separation between the reference plane and the substrate. More specifically, this invention provides a new and improved air gauge for indicating surface location, together with a combined air gauge and mutual inductance gauge providing a direct indication of dielectric coating thickness without necessity for mechanical contact or moving parts. The invention is herein illustratively described by reference to the presently preferred embodiment thereof; however, it will be recognized that certain modifications and changes therein with respect to details may be made without departing from the essential features involved.

An important object hereof is to gauge the location of the surface with accuracy and to provide a substantially linear electrical output response which is proportional to the distance of separation between the surface and the reference plane or gauging point of the instrument. More specifically, it is an object to achieve the foregoing results without mechanical contact with the surface and without the requirement that the surface be electrically conductive or of any special material. In fact, it is a specific object to achieve accurate gauging not only with respect to solid surfaces but also with respect to liquid surfaces.

In gauging the location of liquid surfaces prior air operated gauging devices have been objectionable because of their disruptive effect on the surface due to the impact of the mass of air blown against the surface. Not only is the accuracy of the measurement impaired by disrupting the surface of a liquid, but in the case of measuring dielectric coatings and the like the air blast disturbs the uniformity of the coating and impairs the finished product. An object hereof is to overcome this problem in a gauge in which coupling between the surface and the gauge is through air or other fluid.

Still another object is to provide a reliable gauging device which is relatively compact, convenient to use, inexpensive, and lent to portable applications. For example, while utilizing the previously known principle of detection of back pressure created when air is forced through a restricted orifice defined between the surface to be located and the edge of a nozzle, the present invention obviates the necessity for heavy and expensive air pumps, pressure regulators, etc. while achieving the other objectives hereinabove recited. Moreover the invention provides a gauging device which is stable and which can be easily designed to compensate for ambient pressure conditions, ambient temperature conditions and other causes of fluctuation or inaccuracy in the functioning of previous air gauges.

Moreover the invention provides a versatile device of the nature described which can be used in a wide variety of applications and is relatively insensitive to surface contour within a wide range.

Further objects, relating more specifically to measurement of coating thickness by use of the aforementioned air gauge in combination with a mutual inductance type gauge, are to achieve a thickness measuring device which will not impair the dielectric coating even though it may be in a liquid state, which does not require any specific type of electrically conductive material in the substrate upon which the coating is applied, which is insensitive to variations in dielectric constant of the coating material, which may be made in a portable hand-held instrument, and which generally achieves objects of the nature specified above with respect to the air gauge per se.

Furthermore, the invention provides an accurate linearly responsive gauging device avoiding necessity for complex, bulky and expensive servomechanisms as used in previous gauging devices for measuring dielectric thickness without mechanical contact. Instead the invention provides a simple and accurate gauging circuit operable to derive a voltage or current directly related to dielectric coating thickness and which may be read directly on a simple meter or recording device.

In addition, the invention provides improved gauging techniques whereby separation between the gauging point (i.e. reference plane) of the instrument and the opposing surface to be located or the dielectric coating to be gauged for thickness need not be so critically small as to present serious problems of instrument positioning in order to achieve sufficient accuracy in the readings obtained.

As herein disclosed a gauge nozzle is positioned in close proximity to and directed toward the surface to be located to form therewith an orifice of a size related to the distance of separation. However, instead of subjecting the nozzle to steady-state gas pressure for blowing air unidirectionally through the orifice, the nozzle is subjected to oscillating gas pressure created by a vibrated diaphragm or similar displacement transducer device. In the preferred embodiment this driver comprises a loudspeaker cone having a "voice coil" energized by alternating current at a frequency in the audio range. Driving current to the coil is derived from a modulated source connected in a feedback loop. The feedback loop includes the air column between the vibrated driver cone and the orifice, a pressure sensor transducer such as a microphone, an adding device which compares the sensed air pressure electrical signal with a reference voltage to generate an output signal related to the difference therebetween, and the modulator circuit by which driver velocity (or displacement) is varied in such a manner as to produce a constant oscillatory pressure across the orifice. Preferably the device also includes an A.C. bias source adjustable to nullify the effect of direct coupling between the driver and the pressure sensor (i.e., microphone) so as to render the latter sensitive only to air pressure across the orifice. Distance to the surface is then read directly on a meter which is energized electrically in response to a means for detecting velocity of motion of the air column. A convenient means to detect air velocity is a separate sensing coil carried by the loudspeaker cone and movable in a magnetic field as the cone vibrates. Inasmuch as oscillatory air pressure amplitude is held constant by operation of the feedback loop, cone velocity is directly related to air mass velocity which in turn is directly related to the separation distance to be gauged, and the latter is thereby measured by the sensing coil output voltage amplitude.

In accordance with still other features of this invention, such an air gauge of the oscillatory air mass type represented by this invention is incorporated in a combined system including also a mutual inductance gauge referenced to the same gauging point or plane as the air gauge and operable to convert separation distance between such gauging point and the substrate into linearly related electrical response. The two responses are than applied to a differential indicating device which reads directly the thickness of the coating overlying the substrate. As disclosed the mutual inductance gauging device comprises a first primary coil physically referenced to the gauging point or reference plane, a secondary coil linked with such primary by a mutual inductance factor known to be proportional to the spacing between the coils and the surface (substrate) and means to regulate the amplitude-frequency product of alternating current energizing the primary coil at a constant value. Consequently, the secondary coil output, which may be detected and read directly on a meter, indicates distance to the substrate.

In accordance with a specific feature hereof, the frequency-amplitude product of driver current for the primary coil is regulated at constant value by means of a second primary coil connected serially with the first-mentioned primary so as to be subjected to the same driver current product, a secondary coil coupled to the second-mentioned primary through a constant mutual inductance which remains independent of variation in distance of separation between the substrate surface and the gauging point, and means to modulate amplitude of the oscillatory source current applied to the two primary coils in response to deviation of the latter output from a constant reference value.

These and other features, objects and advantages of the invention will become more fully evident from the following description by reference to the accompanying drawings.

FIGURE 3 is a schematic representation of a combined air gauging and mutual inductance gauging system for measuring thickness of a dielectric coating on a conductive substrate in accordance with the invention.

Figure 1:
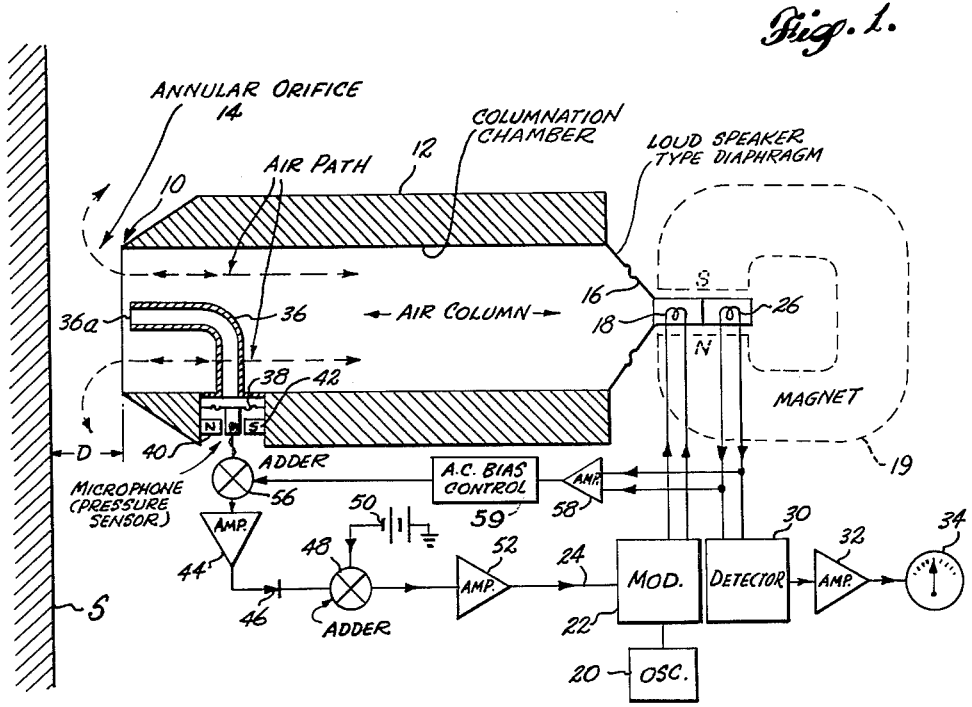
FIGURE 1 is a schematic diagram of the novel air gauging device comprising this invention.

Referring to FIGURE 1, the surface to be located is designated S. The gauging nozzle 10 in this example comprises the annular tip of a circular tube 12, such tip being chamfered to an edge to form, in conjunction with the opposing surface S towards which the nozzle is directed, an annular orifice 14. The open area of this orifice obviously depends upon the distance D separating the surface and the gauging point or plane represented by the nozzle edge 10. The greater this separation the larger the orifice and the more freely the air will move through the orifice under given pressure, whereas the shorter the distance D the greater will be the resistance to flow of air through the orifice. The impedance to flow of air creates a back pressure in the entrance of the nozzle. The larger the orifice the greater will be the velocity of air movement through the nozzle necessary in order to create a given value of pressure difference across the orifice (i.e., inside to outside pressure difference). Customarily air gauges have employed a gas pressure source operable to deliver gas at constant pressure to the nozzle, and a means to sense and display rate of gas flow through the nozzle orifice as an indication of distance of separation between the nozzle and the surface. Pneumatic pumps and pressure regulators were necessitated in such instances and, in order to achieve reasonably linear relationship between flow rate and separation distance, fairly high pressures were necessary.

In accordance with this invention as herein disclosed the column of air held in the cylindrical chamber enclosed by the tube 12 is not moved in a unidirectional manner under the pressure of a constant-pressure source but the air is vibrated by an oscillatory source, such as a loudspeaker cone 16. The diaphragm or cone 16, usually of paper-like material, encloses the end of the columnation chamber opposite the nozzle 10. The speaker cone is driven by a "voice coil" 18 which lies in the field of a magnet 19 and is energized by oscillator 20 through a modulator 22 which controls the amplitude of the oscillations applied to the voice coil in accordance with the value of direct current or voltage applied to the modulator through the modulator input connection thereof, 24. A similar second coil 26 mounted upon the speaker diaphragm to vibrate therewith senses the velocity of motion of the speaker cone by the amplitude of alternating voltage induced in the coil 26. This alternating voltage is applied to the detector 30 whose output is amplified in the amplifier 32 for application to the direct-reading galvanometer 34. As will become evident the latter may be calibrated directly in terms of distance D, and the scale will be a substantially linear one.

The resulting vibration of the column of air lying within the tube 12 creates pressure oscillations across the annular orifice 14 and consequent alternating inflow and outflow of air through the orifice. Orifice pressure is measured by suitable means such as a microphone. A sampling tube 36 having an entrance 36a located at or immediately behind the nozzle 10 communicates with one side of the microphone diaphragm 38. The opposite side of the diaphragm is placed in communication with the atmosphere so that the resultant diaphragm displacement is influenced by the pressure difference across the orifice. A sensing coil 40 is mounted on such diaphragm in the field of a permanent magnet 42. The alternating voltage induced in coil 40 is proportional in amplitude to the pressure difference across the annular orifice 14, as desired. This induced voltage proportional to oscillating pressure difference amplitude is applied to the amplifier 44, rectified in the detector 46 and applied to one input of the algebraic adding device 48. Reference voltage corresponding to the desired regulated value of oscillatory air pressure amplitude is provided by a direct-current source 50. This voltage is applied to a second input of the adding device. Output of the adding device 48 comprises a direct voltage proportional to the algebraic sum of the two inputs, that is to deviation of orifice pressure amplitude, up or down, from the regulated value. This output is applied to the amplifier 52 for application as a control voltage to the modulator 22 through input lead 24. If the pressure difference across the annular orifice 14 exceeds a predetermined regulated value, a difference voltage of one polarity will be applied to the amplifier 52 which will, through the action of the modulator 22, reduced the amplitude of energization current applied to the driver coil 18. On the other hand, if the orifice difference pressure is less than the regulated value a difference voltage of relatively opposite polarity will be produced by the adding device 48 and will, through the action of modulator 22, decrease the amplitude of the driving current applied to the driving coil 18. Consequently, the oscillatory air pressure difference created across the annular orifice 14 is regulated at a substantially constant value by the action of the feedback loop comprising the microphone unit 38, 40, the adding device 48 and its associated components, the modulator 22 which controls amplitude of oscillations applied to the driver coil 18, and of course the air column itself.

It is found in practice that there can be a tendency for the microphone coil 40 to produce a steady-state output signal independent of air pressure across the annular orifice 14 produced by proximity to a surface S. This is attributable to direct acoustic and physical coupling between the speaker system and the microphone 38, 40 through the air column and the nozzle structure. In order to eliminate this quiescent signal component from the output of the microphone coil 40 a nullifying A.C. bias is superimposed upon the output of the coil 40 through an auxiliary adding device 56 interposed in the connections between the microphone coil 40 and the amplifier 44. This superimposed bias signal is derived directly from the output of the velocity sensor coil 26 through connections including the amplifier 58 and the serially connected bias control device 59 which comprises a variable potentiometer or other means to adjust the A.C. bias at precisely the value necessary to nullify the quiescent signal component. Of course by deriving the nullifying signal from the output of the velocity sensor coil 26 the nullifying A.C. bias signal remains equal to the signal to be nullified even though the latter may vary due to instabilities in the system. This is true because it is the amplitude of vibration of the loudspeaker cone that produces the extraneous signal in the microphone coil 40, and this the velocity sensor coil 26 senses. The signal applied to the driver coil 18 does not bear the same relationship to the microphone coil signal because of the non-linearity in the relationship between amplitude of the driving signal applied to the driver coil 18 and the actual mechanical vibration velocity and amplitude of the loudspeaker cone as a physical mass.

By the application of oscillatory air pressure producing essentially sinusoidal displacement of the gas in the columnation chamber, hence through the annular orifice 14 it is possible with the improved gauging device to gauge relatively large distances of separation D with relatively small nozzle units. Previously, with air gauges using constant gas pressure, distances of separation greater than 0.1 inch usually required a correspondingly large nozzle diameter in order to achieve approximately linear indication. In that event a large gas flow at a low pressure was required, causing difficulty in achieving accurate static measurements. With the present invention however, employing substantially sinusoidal gas displacement so generated as to maintain the sinusoidal pressure amplitude at the nozzle orifice substantially constant, amplitude or velocity of the sinusoidal displacement (as detected by the coil 26) is a substantially linear function of the distance of separation D, and only very minute air movements are required. Moreover the techniques for amplifying, detecting, controlling, biasing, etc. are greatly simplified by the A.C. techniques made possible and overall stability of the system is greatly enhanced. Thus the resultant instrument is simpler, less expensive and more reliable, stable and compact than previous air gauges. Further, it has no adverse effect upon the condition of the surface S, which is important especially in the case of a liquid surface or one which would be disturbed by large air mass movements as in prior devices. The sinusoidal pressure difference across the orifice may be equated to the sinusoidal absolute pressure within the nozzle if one assumes the external sinusoidal pressure to be negligible, which is true for many if not most practical cases. Thus the microphone if desired may be designed to operate solely in response to absolute pressure within the nozzle if desired, and will produce substantially equivalent results.

Figure 2:
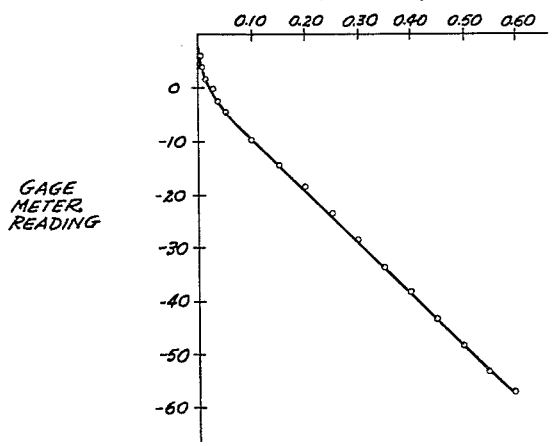
FIGURE 2 is a graphic representation of the response characteristic of such a device.

Performance of an oscillatory air gauge of the type illustrated in FIGURE 1 is shown graphically in the performance curve depicted in FIGURE 2. It will be noted that the curve is substantially linear throughout a wide range of distances D.

One application of the air gauge invention, among the many for which it is suitable, is to sense surface location of a moist dielectric coating applied to a conductive substrate, as in the case of applying thermoplastic coatings to metallic surfaces for protective reasons or otherwise. In that event the oscillatory gas gauge device such as that shown in FIGURE 1 becomes part of a combination instrument which also includes means to gauge the related location of the substrate so that the mere operation of subtracting the two distances from each other in an electrical circuit produces a direct indication of coating thickness. Such a system appears in FIGURE 3.

In FIGURE 3 the oscillatory air gauge of FIGURE 1 is depicted within the broken line G and produces an output direct voltage or current in conductor 60 proportional to the distance D separating the gauging plane P and the surface S. In this instance surface S represents the exposed surface of a coating of dielectric material of thickness C applied to a substrate S′ of electrically conductive material. The problem solved by the combined apparatus is to so energize the meter 62 as to read directly the coating thickness C. To accomplish this the instrument also includes a mutual inductance gauging device M which is so cooperatively related with the oscillatory air gauging device G as to produce an output voltage or current in the conductor 64, directly related to the distance D′ between the reference plane P and the substrate S′, and to the voltage or current in the conductor 60 that the difference between such voltages or current, as measured by the summing device 66, represents coating thickness C and may be read directly on meter 62.

For these purposes, the mutual inductance gauging device M has a first primary winding 68 and a cooperative first secondary winding 70 congruently positioned in relation to the primary winding either in or in predetermined relation to the gauging plane P. It was previously known and established that the mutual inductance between two such windings disposed with their common axis normal to a conductive surface is directly proportional to the distance of separation, D′. However in a practical gauging instrument, subjected as it is to temperature effects, physical positioning problems and other causes of instability or misreferencing of circuit conditions or values, the measurement of mutual inductance with a degree of linearity and stability of the same order of magnitude as that of which the oscillatory air gauge G is capable presented serious problems. In accordance with other features of this invention these problems are overcome by connecting a second primary winding 72 serially with the primary winding 68 and with a source of alternating current, such as oscillator 74. The windings 68 and 72 are connected as part of the oscillator tank circuit for the sake of efficiency in energizing the windings with alternating current. Further, a secondary winding 76 having constant mutual inductance with primary 72 provides an output voltage proportional to the product of the frequency and the current applied to the two primaries. This output voltage is fed to amplifier 80, thence detector 82 for comparison in adder 84 with a constant reference voltage derived from a source 86. The output of adding device 84 is then a direct voltage of a magnitude and polarity determined by the algebraic difference between its two inputs. Such output is applied to a D.C. amplifier and modulator circuit 86 which controls the oscillator 74 to either increase or decrease the output amplitude of the latter. The resultant feedback loop including secondary 76, detector 82, adder 84 and oscillator 74 thereby regulates the $\omega i$ product applied to primary 68 at a substantially constant value independent of any causes of instability therein including, of course, variations in the distance D′ itself.

With the $\omega i$ product of primary 68 thus regulated, the output of secondary 70 becomes directly proportional to distance D′. Appropriate amplification in amplifier 88 and rectification in detector 90 yields a value of direct voltage or current in output conductor 64 on the same scale of values as that delivered by output conductor 60 from the air gauge portion of the composite system. Thus the differential output from adding device 64 applied to meter 62 provides a direct indication of coating thickness C as desired.

Such a combination apparatus proves capable of extremely accurate readings of liquid coating thickness, on a substantially linear scale of thickness and substantially independent of variations in the distance D separating the reference or gauging plane P and the coating surface. In other words the compared measured values of D and D′ retain a substantially constant relationship without critical dependence being placed on degree of proximity of the instrument to the surface within a range from nearly zero to the better part of an inch or more. Further the coating surface is not disturbed by the measurement even if still in the liquid state, nor are the readings adversely affected as to accuracy by variations in electrical conductivity of the substrate or degree of hardness or rigidity of the coating. Such an instrument may be packaged compactly in a comparatively small or miniaturized form and has sufficient versatility for many applications of gauging coating thickness and/or surface location. Merely by opening switch 92 in lead 60, with switch 94 closed in lead 64, meter 62 will read distance D. With the switch positions reversed, meter 62 will read distance D'. With both switches closed it reads D'–D or C.

These and other aspects of the invention will appear from an understanding of the preferred embodiment as described.

I claim as my invention:

1. Apparatus for measuring distance to a surface, comprising nozzle means which in use is positioned in spaced relation to the surface to define an orifice therebetween, fluid displacement means including a vibratable member operatively associated with the nozzle means to apply oscillatory fluid pressure across the orifice at predetermined frequency, means responsive to deviations in such oscillatory pressure from a predetermined value and operatively connected to said fluid displacement means to regulate said oscillatory pressure at a predetermined value thereby, and means for measuring the vibrations of said vibratable member, as a measure of distance to the surface.

2. The apparatus defined in claim 1, wherein the last-mentioned means comprises means operatively associated with the vibratable member for detecting velocity of movement of such member.

3. The apparatus defined in claim 1, wherein the nozzle means comprises an enclosure defining an elongated cylindrical chamber terminating at one end in a nozzle opening, wherein the fluid displacement means comprises a vibratable diaphragm mounted in the opposite end of the enclosure and having a driver element thereon, and a source of alternating current connected to energize the driver element, and wherein the means for measuring vibration of the vibratable member comprises a detecting transducer element physically connected with the diaphragm and operable to produce an output alternating current proportional to diaphragm vibration, and means to measure such current.

4. The apparatus defined in claim 3, wherein the means to regulate oscillatory pressure comprises transducer means electrically responsive to pressure within the chamber, circuit means utilizing the electrical response of such transducer means to regulate said alternating current source, and alternating current bias means connected to said circuit means and responsive to vibration of said vibratable member for nullifying electrical signal components in said circuit means which exist independently of distance to the surface.

5. Apparatus for measuring thickness of a dielectric coating on an electrically conductive substrate, comprising in combination with means to measure distance to the substrate, nozzle means which in use is positioned in spaced relation to the coating surface to define an orifice therebetween, fluid displacement means including a vibratable member operatively associated with the nozzle means to apply oscillatory fluid pressure across the orifice at predetermined frequency, means responsive to deviations in such oscillatory pressure from a predetermined value and operatively connected to said fluid displacement means to regulate said oscillatory pressure at a predetermined value thereby, and means for measuring the vibrations of said vibratable member, as a measure of distance to the surface.

6. The apparatus defined in claim 5, wherein the means for measuring distance to the substrate comprises fixedly related primary and secondary inductance windings disposable adjacent the substrate surface and having a mutual inductance variable with distance thereof to such substrate surface, a source of alternating current energizingly connected to said primary, means connected to said source and operable to regulate the frequency-amplitude product of current in the primary at substantially constant value, and means to measure the output of the secondary and thereby said distance to the substrate.

7. Apparatus for measuring thickness of a dielectric coating on an electrically conductive substrate, comprising means to measure distance to the substrate, including fixedly related primary and secondary inductance windings disposable in use adjacent the coating surface and having mutual inductance variable with distance to such substrate from a predetermined reference point fixedly related to said windings, circuit means operatively associated with said windings to pass alternating current through the primary winding and including means responsive to secondary current to produce a first electric output signal related to said mutual inductance, means to measure distance to the dielectric surface from said reference point, including a fluid directing nozzle means defining cooperatively with said surface a restricted orifice, vibrator means including an element vibrated in contact with the fluid creating predetermined oscillatory fluid pressure differences across said orifice at predetermined frequency and amplitude, means to measure the relationship between such vibrations and oscillatory pressure on at least one side of the orifice and thereby to produce a second electric output signal related to said latter distance, and thickness indicator means differentially responsive to said first and second output signals.

8. Apparatus for measuring thickness of a dielectric coating on an electrically conductive substrate, comprising means to measure distance to the substrate, including fixedly related primary and secondary inductance windings disposable in use adjacent the coating surface and having mutual inductance variable with distance to such substrate from a predetermined reference point fixedly related to said windings, circuit means operatively associated with said windings to pass alternating current through the primary winding and including means responsive to secondary current to produce a first electric output signal related to said mutual inductance, means to measure distance to the dielectric surface, including a fluid directing nozzle means defining cooperatively with said surface a restricted orifice, vibrator means including an element vibrated in contact with the fluid creating fluid pressure differences across said orifice at predetermined frequency and amplitude, means to measure the relationship between such vibrations and oscillatory pressure on at least one side of the orifice and thereby to produce a second electric output signal related to said latter distance, and thickness indicator means differentially responsive to said first and second output signals.

9. Apparatus for measuring distance to a surface, comprising an air chamber having an opening therein and disposable with its opening directed towards the surface so as to define an orifice therebetween through which the chamber communicates with surrounding space, vibrator means physically associated with the chamber and including an element which vibrates in the chamber to create oscillatory air pressure difference across the orifice at predetermined frequency, transducer means responsive to oscillatory air pressure adjacent the chamber side of the orifice to produce an output therefrom, said vibrator means further including regulatory modulator means connected to be responsive to said output and operable to regulate such oscillatory air pressure at substantially predetermined value by changing the magnitude of vibrations of said element in response to deviations of said output from a predetermined reference value, and means operable to measure the vibrations of said vibratable element as a measure of said distance.

10. The apparatus defined in claim 8 and negative feedback means connected for deriving an oscillatory signal from vibrations of the vibratable element and applying the same to the regulatory modulator means for substantially nullifying any component of transducer output attributable to direct coupling of vibrational energy to the transducer means from said vibrator means which is independent of distance being measured.

11. Apparatus for measuring distance to a surface, comprising an air chamber having an opening therein and disposable with its opening directed towards the surface so as to define an orifice therebetween through which the chamber communicates with surrounding space, vibrator means physically associated with the chamber and including an element which vibrates in the chamber to create oscillatory air pressure difference across the orifice at predetermined frequency, transducer means responsive to oscillatory air pressure adjacent the chamber side of the orifice to produce an output therefrom, said vibrator means further including regulatory modulator means connected to be responsive to said output and operable to regulate such oscillatory air pressure at substantially predetermined value by changing the magnitude of vibrations of said element in response to deviations of said output from a predetermined reference value, and means responsively connected to the vibrator means for indicating changes in vibration produced by said element as a function of changing distance to the surface.

12. The method of gauging distance to a surface in a fluid medium employing an orifice-defining member separated from the surface by the distance to be measured, comprising the steps of applying vibration to the fluid on one side of the orifice of predetermined frequency and controlled amplitude so as to produce oscillatory pressure difference across said orifice which varies as a function of such distance comprising the width of the orifice, and measuring the relationship between such vibrations and oscillatory pressure on at least one side of the orifice as a measure of such distance.

13. The method defined in claim 12 including the step of regulating the oscillatory pressure ampltude at a substantially constant value by controlling the amplitude of such vibrations applied to the fluid, and wherein the step of measuring distance comprises measuring the applied virbrations directly.

References Cited by the Examiner

UNITED STATES PATENTS

| 2,047,974 | 7/1936 | Lehr et al. | 73—290 X |
| 2,481,345 | 9/1948 | Reynst | 324—34 |
| 2,537,731 | 1/1951 | Angell | 324—34 |
| 2,584,128 | 2/1952 | Hildyard | 73—290 X |
| 2,927,455 | 3/1960 | Outterson | 73—37.7 |
| 2,986,924 | 6/1961 | Becker | 73—290 X |
| 3,059,466 | 10/1962 | Urmenyi | 73—37.7 |
| 3,130,808 | 4/1964 | Walker | 340—18 X |

FOREIGN PATENTS 748,729   12/1944   Germany.

LOUIS R. PRINCE, *Primary Examiner.*

ISAAC LISANN, F. H. THOMSON, *Assistant Examiners.*